(12) United States Patent  (10) Patent No.: US 6,578,785 B1
Hong  (45) Date of Patent: Jun. 17, 2003

(54) FLY FISHING REEL WITH A POSITIONING UNIT

(76) Inventor: Eugene Hong, 11F-6, No. 333, Sec. 2, Hua-Mei W. St., Hsi-Tun Dist., Taichung City (TW)

( * ) Notice: Subject to any disclaimer, the term of this patent is extended or adjusted under 35 U.S.C. 154(b) by 0 days.

(21) Appl. No.: 10/054,820

(22) Filed: Jan. 25, 2002

(51) Int. Cl.[7] ................................................. A01K 89/02
(52) U.S. Cl. ....................... 242/245; 242/265; 242/285; 242/317
(58) Field of Search ................................ 242/244, 245, 242/246, 264, 265, 266, 267, 285, 304, 317

(56) References Cited

U.S. PATENT DOCUMENTS

| | | | | |
|---|---|---|---|---|
| 1,789,178 A | * | 1/1931 | Johnson | 242/259 |
| 2,987,266 A | * | 6/1961 | Arola | 242/265 |
| 2,993,660 A | * | 7/1961 | Parks | 242/295 |
| 4,526,331 A | * | 7/1985 | Tunks | 242/266 |
| 5,219,131 A | * | 6/1993 | Furomoto | 242/223 |
| 5,560,562 A | * | 10/1996 | Hartmann | 242/255 |
| 6,364,228 B1 | * | 4/2002 | Datcuk, Jr. | 242/244 |

* cited by examiner

*Primary Examiner*—Emmanuel Marcelo
(74) *Attorney, Agent, or Firm*—Morgan, Lewis & Bockius LLP

(57) ABSTRACT

A fly fishing reel includes a casing, a spool mounted rotatably in the casing, a handle connected to the spool via a connecting rod, an arcuate plate attached to the casing and formed with a plurality of angularly spaced apart retaining-holes, a drag adjustment lever having one end pivoted to the connecting rod, a positioning unit pivoted to the other end of the lever and having a retaining pin selectively and releasably engaging one of the retaining-holes so as to position the lever, and a releasing unit for disengaging the retaining pin from the selected one of the retaining-holes.

2 Claims, 4 Drawing Sheets

FLY FISHING REEL WITH A POSITIONING UNIT

BACKGROUND OF THE INVENTION

1. Field of the Invention

This invention relates to a fly fishing reel, more particularly to a fly fishing reel with a positioning unit for positioning a drag adjustment lever of the fly fishing reel.

2. Description of the Related Art

FIG. 1 illustrates a conventional fly fishing reel that includes a casing 200, a spool 220 mounted rotatably in the casing 200, and a handle 210 connected to the spool 220 via a connecting rod 211 for winding a fishing line (not shown) on the spool 220. An arcuate plate 100 is attached to an end face 201 of the casing 200, and serves as a measuring scale for indication of the quantity of drag resistance to rotation of the spool 220. A drag adjustment lever 2 is pivoted to the connecting rod 211 so as to rotate thereabout and so as to adjust the quantity of the drag resistance to the rotation of the spool 220. A spring-biased stopper 3 extends movably out of a side edge of the casing 200 adjacent to the end face 201, and serves as an indication of an intermediate drag resistance to the rotation of the spool 220 when the drag adjustment lever 2 is moved to abut against the stopper 3. The stopper 3 releasably engages a bent end 201 of the drag adjustment lever 2 so as to stop further rotation of the drag adjustment lever 2. The stopper 3 is pressable into the casing 200 so as to permit the drag adjustment lever 2 to pass over the stopper 3. The stopper 3 can prevent undesirable movement or over-rotation of the drag adjustment lever 2. However, it is inconvenient to simultaneously press the stopper 3 and operate the drag adjustment lever 2 to pass over the stopper 3 to a desired position.

SUMMARY OF THE INVENTION

Therefore, the object of the present invention is to provide a fly fishing reel with a positioning unit that is capable of overcoming the aforementioned drawback.

According to the present invention, a fly fishing reel comprises: a casing having an outer end face; a spool mounted rotatably in the casing; an arcuate plate attached to the outer end face and formed with a plurality of angularly spaced apart retaining-holes that serve as a measuring scale representing different quantities of drag resistance to rotation of the spool; a connecting rod transverse to and extending rotatably through the outer end face at a position radially spaced apart from the arcuate plate, the connecting rod having one end connected to the spool; a handle connected to the other end of the connecting rod for turning the spool via the connecting rod; a drag adjustment lever having a pivot end pivoted to the connecting rod between the handle and the arcuate plate, and a fixed end opposite to the pivot end and extending radially from the connecting rod to confront the arcuate plate, the drag adjustment lever being rotatable about the connecting rod relative to the arcuate plate for adjusting the drag resistance to the rotation of the spool; a positioning unit including a tubular member having opposite inner and outer ends, a retaining pin disposed in the tubular member and extending axially through the inner end to selectively engage one of the retaining-holes so as to position the drag adjustment lever at a selected position relative to the arcuate plate, and an urging member connected to the retaining pin and abutting against the outer end for urging the retaining pin to move into the selected one of the retaining-holes; and a releasing unit including an actuating member extending movably through the tubular member, and a cam mechanism disposed in the tubular member and associated with the actuating member and the retaining pin in such a manner that movement of the actuating member results in movement of the retaining pin in an axial direction between an engaging position, in which, the retaining pin is urged by the urging member to extend into the selected one of the retaining-holes, and a disengaging position, in which, the retaining pin moves out of and thus disengages from the selected one of the retaining-holes, thereby permitting rotation of the drag adjustment lever relative to the arcuate plate.

BRIEF DESCRIPTION OF THE DRAWINGS

In drawings which illustrate an embodiment of the invention.

DETAILED DESCRIPTION OF THE PREFERRED EMBODIMENT

Figure 1:
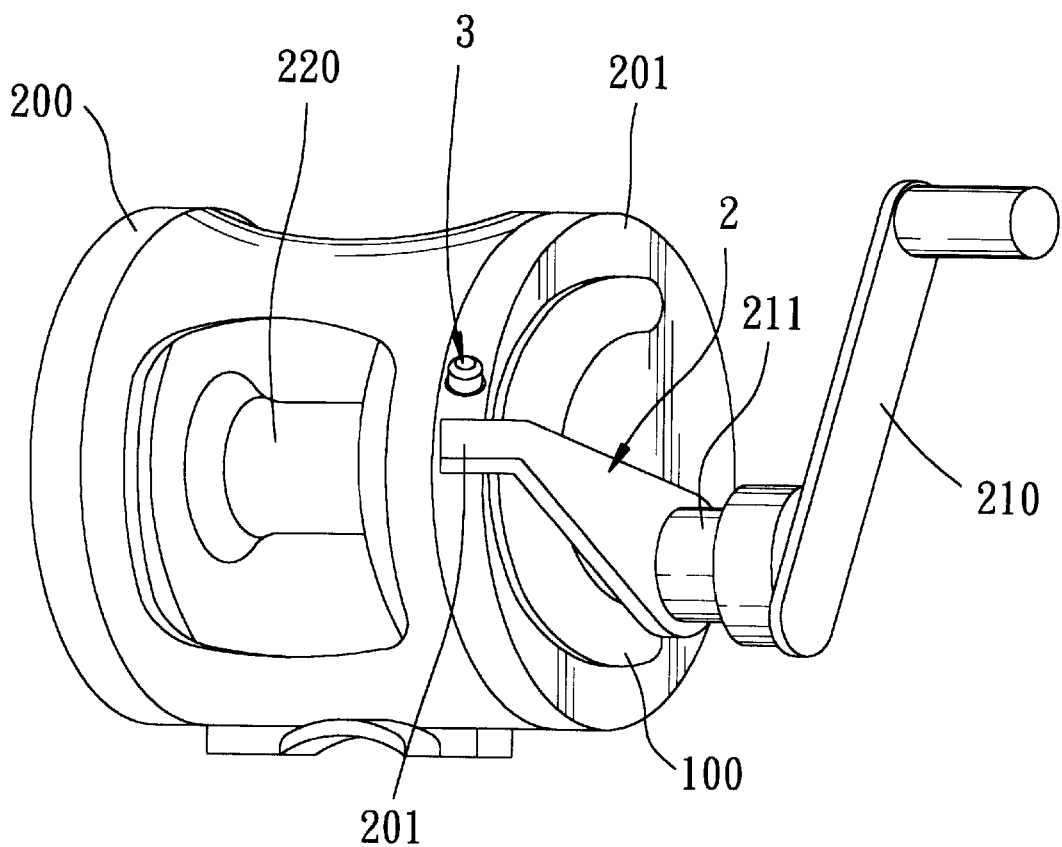
FIG. 1 is a perspective view of a conventional fly fishing reel.
Figure 2:
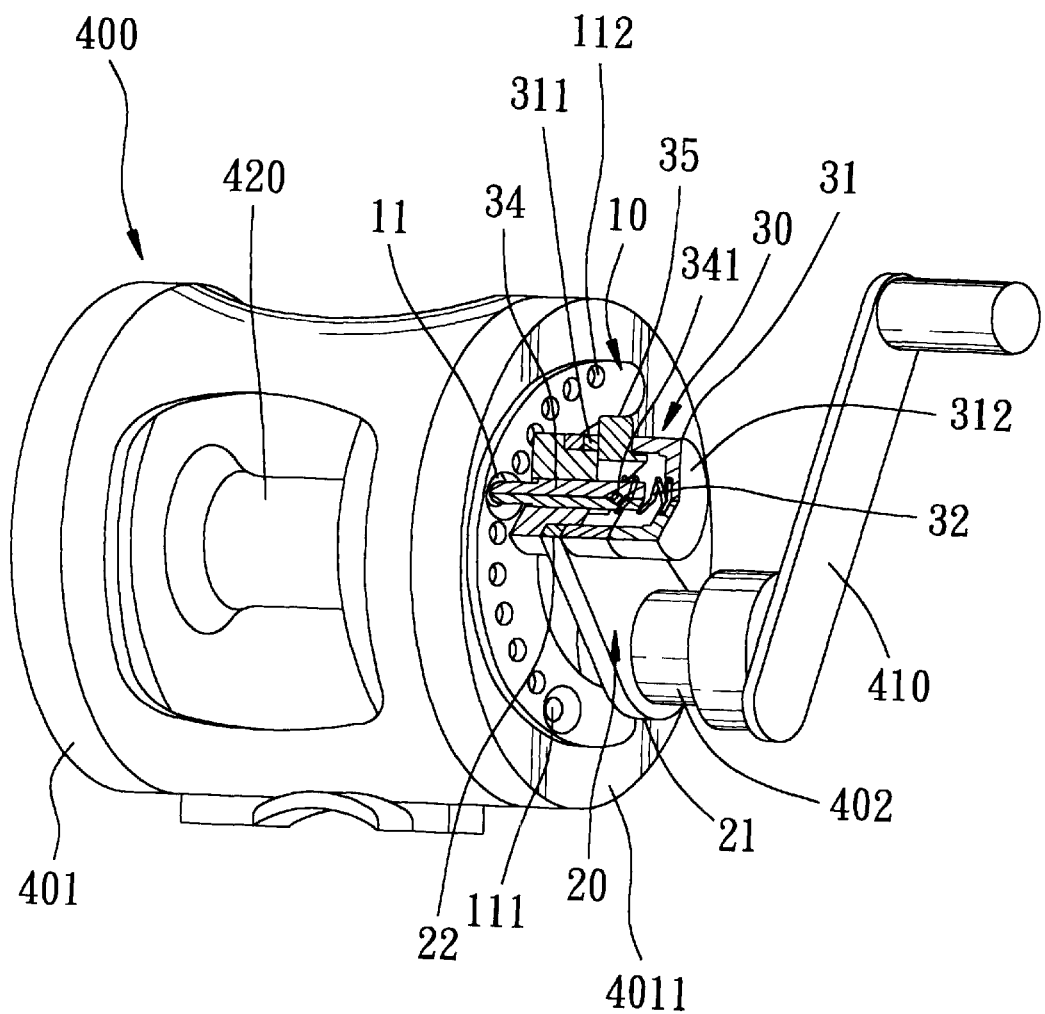
FIG. 2 is a perspective partly cutaway view of a fly fishing reel embodying this invention.
Figure 3:
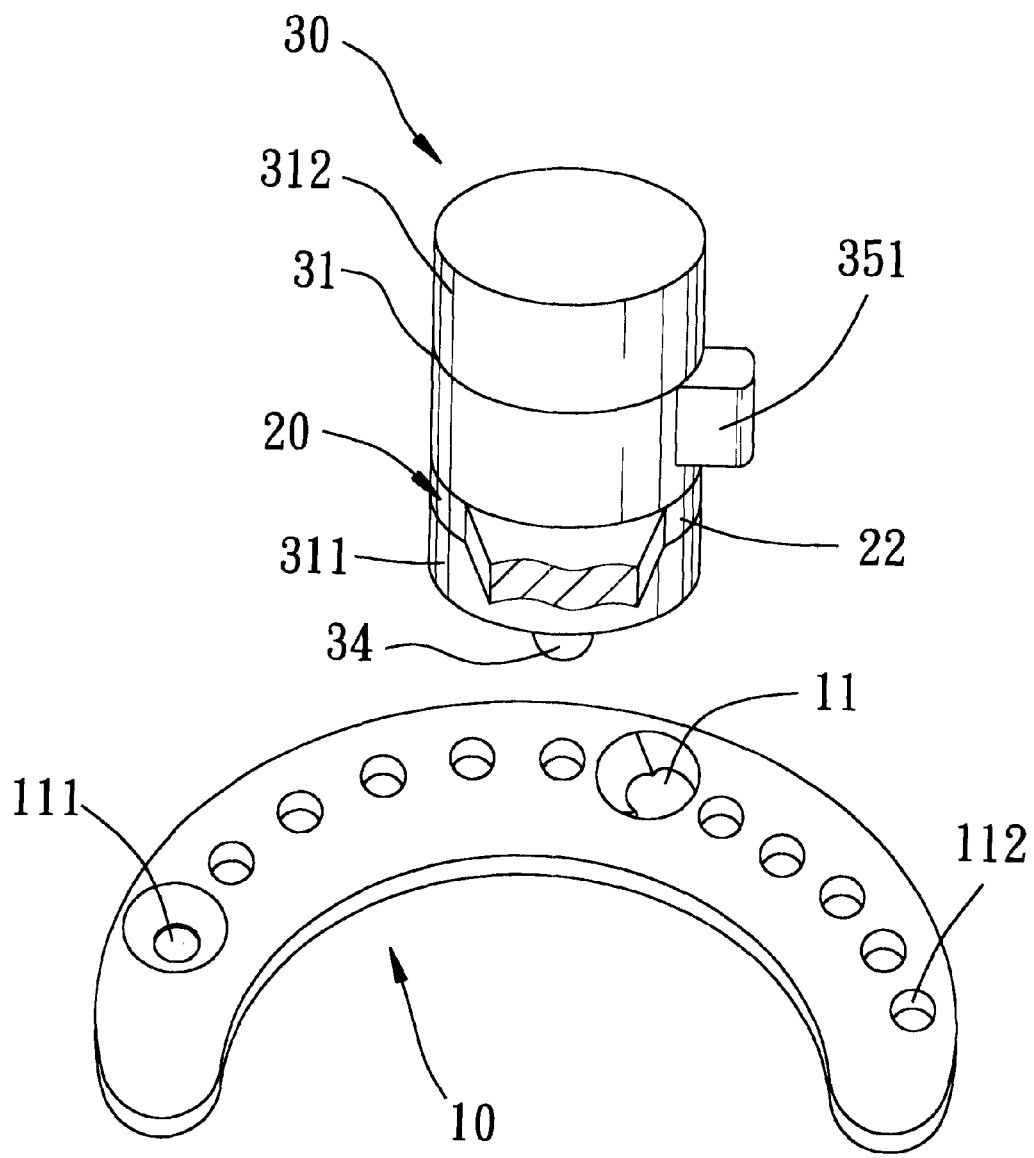
FIG. 3 is an exploded perspective view of a positioning unit of the fly fishing reel of FIG. 2.
Figure 4:
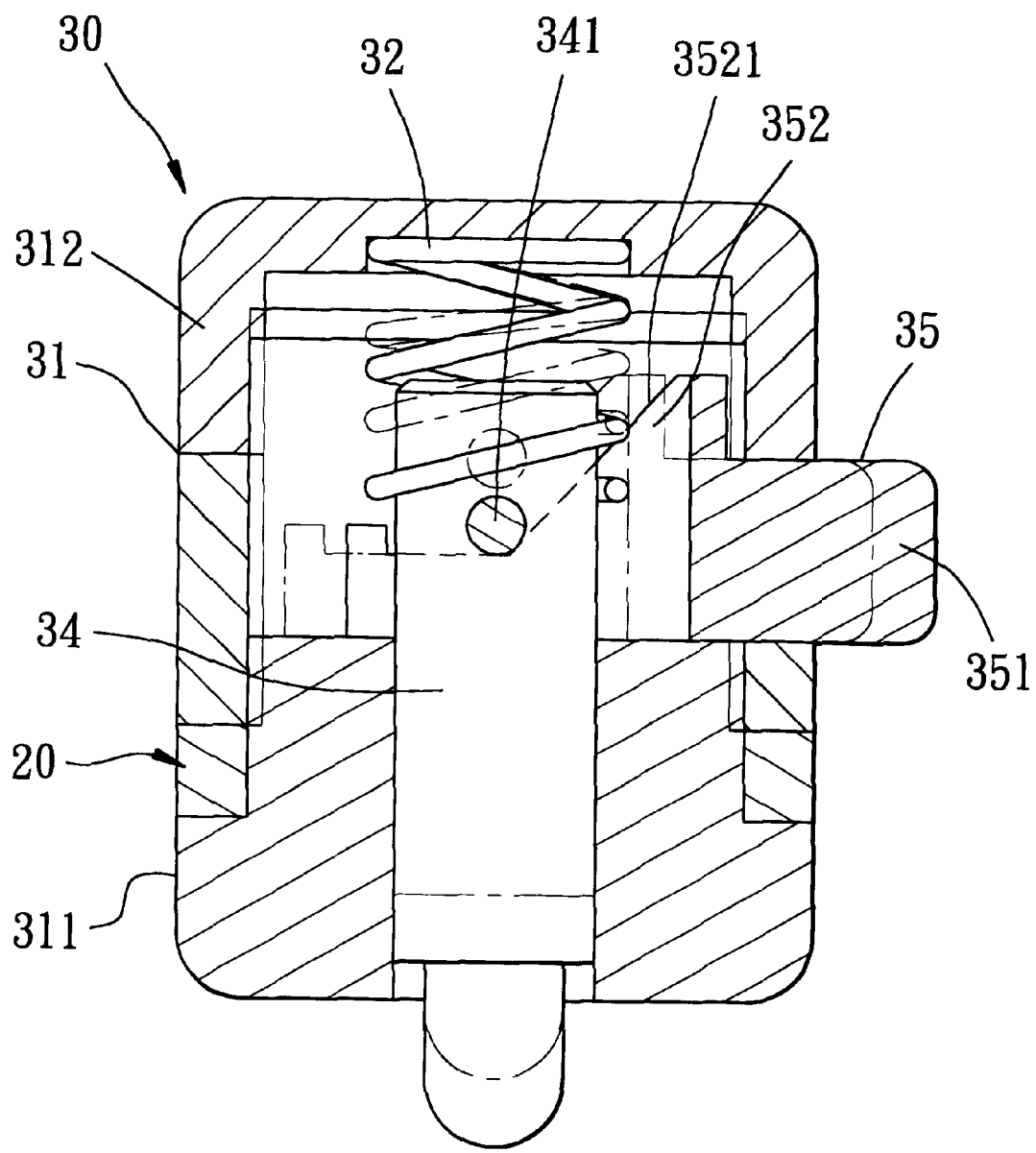
FIG. 4 is a sectional view of the positioning unit of FIG. 3.

FIGS. 2 to 4 illustrate a fly fishing reel 400 embodying this invention.

The fly fishing reel 400 includes: a casing 401 having an outer end face 4011; a spool 420 mounted rotatably in the casing 401; an arcuate plate 10 attached to the outer end face 4011 and formed with a plurality of angularly spaced apart retaining-holes 11 that serve as a measuring scale representing different quantities of drag resistance to rotation of the spool 420, the retaining-holes 11 including uppermost and lowermost retaining-holes 111, 112 that respectively represent upper and lower limits of the drag resistance to the rotation of the spool 420; a connecting rod 402 transverse to and extending rotatably through the outer end face 4011 at a position radially spaced apart from the arcuate plate 10, the connecting rod 402 having one end that is connected to the spool 420; a handle 410 connected to the other end of the connecting rod 402 for turning the spool 420 via the connecting rod 402; a drag adjustment lever 20 having a pivot end 21 pivoted to the connecting rod 402 between the handle 410 and the arcuate plate 10, and a fixed end 22 opposite to the pivot end 21 and extending radially from the connecting rod 402 to confront the arcuate plate 10, the drag adjustment lever 20 being rotatable about the connecting rod 402 relative to the arcuate plate 10 between the uppermost and lowermost retaining-holes 111, 112 for adjusting the drag resistance to the rotation of the spool 420; a positioning unit 30 including a tubular member 31 having opposite inner and outer ends 311, 312, a retaining pin 34 disposed in the tubular member 31 and extending axially through the inner end 311 to selectively engage one of the retaining-holes 11 so as to position the drag adjustment lever 20 at a desired position relative to the arcuate plate 10, and an urging member 32 connected to the retaining pin 34 and abutting against the outer end 312 for urging the retaining pin 34 to move into the selected one of the retaining-holes 11; and a releasing unit including an actuating member 35 extending movably through the tubular member 31, and a cam mechanism disposed in the tubular member 31 and associated with the actuating member 35 and the retaining pin 34 in such a manner that movement of the actuating member 35 results in movement of the retaining pin 34 in an axial direction between an engaging position, in which, the retaining pin 34 is urged by the urging member 32 to extend into the selected one of the retaining-holes 11, and a disengaging position, in which, the retaining pin 34 moves out of and thus disengages from the selected one of the retaining-holes 11, thereby permitting rotation of the drag adjustment lever 20 relative to the arcuate plate 10.

The actuating member 35 includes a block body 351 extending radially through the tubular member 31. The cam mechanism includes a cam member 352 that extends from the block body 351 and that defines an inclined surface 3521, and a cam follower 341 that protrudes radially from the retaining pin 34 and that engages the inclined surface 3521 so that radial movement of the block body 351 results in sliding movement of the cam follower 341 on the inclined surface 3521 in the axial direction, which, in turn, results in axial movement of the retaining pin 34.

With the inclusion of the positioning unit 30 and the releasing unit in the fly fishing reel 400, simultaneous pressing of the actuating member 35 and turning of the drag adjustment lever 20 between the uppermost and lowermost retaining-holes 111, 112 can be carried out by simply using two fingers. As such, the aforesaid inconvenience encountered in the prior art can be eliminated.

With the invention thus explained, it is apparent that various modifications and variations can be made without departing from the spirit of the present invention. It is therefore intended that the invention be limited only as recited in the appended claims.

I claim:

1. A fly fishing reel comprising:

a casing having an outer end face;

a spool mounted rotatably in said casing;

an arcuate plate attached to said outer end face and formed with a plurality of angularly spaced apart retaining-holes that serve as a measuring scale representing different quantities of drag resistance to rotation of said spool;

a connecting rod transverse to and extending rotatably through said outer end face at a position radially spaced apart from said arcuate plate, said connecting rod having one end connected to said spool;

a handle connected to the other end of said connecting rod for turning said spool via said connecting rod;

a drag adjustment lever having a pivot end pivoted to said connecting rod between said handle and said arcuate plate, and a fixed end opposite to said pivot end and extending radially from said connecting rod to confront said arcuate plate, said drag adjustment lever being rotatable about said connecting rod relative to said arcuate plate for adjusting the drag resistance to the rotation of said spool;

a positioning unit including a tubular member having opposite inner and outer ends, a retaining pin disposed in said tubular member and extending axially through said inner end to selectively engage one of said retaining-holes so as to position said drag adjustment lever at a selected position relative to said arcuate plate, and an urging member connected to said retaining pin and abutting against said outer end for urging said retaining pin to move into the selected one of said retaining-holes; and a releasing unit including an actuating member extending movably through said tubular member, and a cam mechanism disposed in said tubular member and associated with said actuating member and said retaining pin in such a manner that movement of said actuating member results in movement of said retaining pin in an axial direction between an engaging position, in which, said retaining pin is urged by said urging member to extend into the selected one of said retaining-holes, and a disengaging position, in which, said retaining pin moves out of and thus disengages from the selected one of said retaining-holes, thereby permitting rotation of said drag adjustment lever relative to said arcuate plate.

2. The fly fishing reel of claim 1, wherein said actuating member includes a block body extending radially through said tubular member, said cam mechanism including a cam member that extends from said block body and that defines an inclined surface, and a cam follower that protrudes radially from said retaining pin and that engages said inclined surface so that radial movement of said block body results in sliding movement of said cam follower on said inclined surface in said axial direction, which, in turn, results in the axial movement of said retaining pin.

* * * * *